May 19, 1942.   J. C. CROWLEY   2,283,490
CAP OR CLOSURE MEMBER FOR VALVE STEMS
Filed Sept. 14, 1939
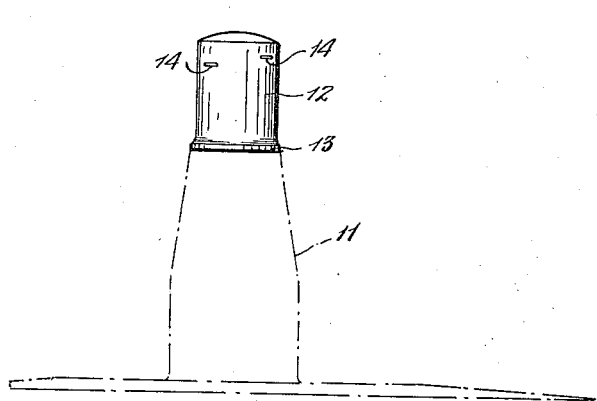
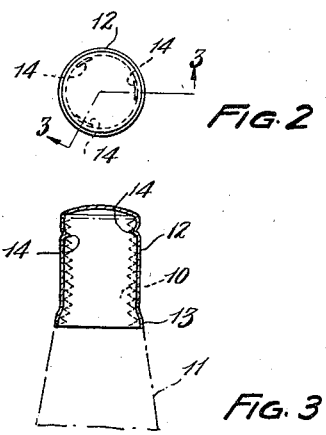
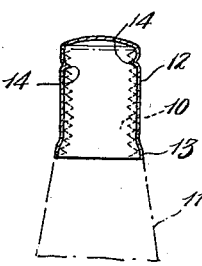
Fig. 1
Fig. 2
Fig. 3
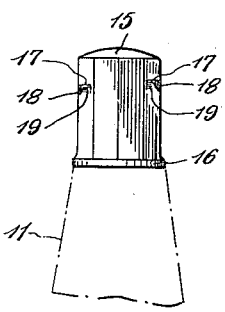
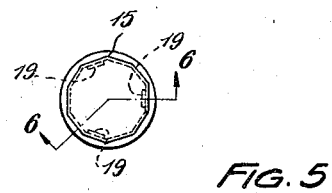
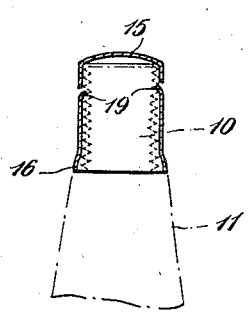
Fig. 4
Fig. 5
Fig. 6
INVENTOR.
JOHN C. CROWLEY
BY Kwis Hudson & Kent
ATTORNEYS Patented May 19, 1942

2,283,490

UNITED STATES PATENT OFFICE 2,283,490

CAP OR CLOSURE MEMBER FOR VALVE STEMS

John C. Crowley, Cleveland Heights, Ohio, assignor to The Dill Manufacturing Company, Cleveland, Ohio, a corporation of Ohio Application September 14, 1939, Serial No. 294,904

3 Claims. (Cl. 138—89.3)

This invention relates to a cap or closure for the outer end of a valve stem such as is commonly used on the inner tube of a pneumatic tire or on other types of inflatable articles.

It is desirable that the valve stems used on inner tubes of pneumatic tires have their outer ends closed against the ingress of dirt, dust, moisture or other foreign matter which might have a deleterious effect on the valve insides or cores mounted in the stems and on the efficient operation thereof. It has been customary, therefore, to provide caps or closure members for the outer end of the valve stems and which caps or closure members are internally threaded so as to screw upon the reduced exteriorly threaded nipples that most valve stems have at their outer ends.

The manufacturers of tire tubes ordinarily equip the valve stems of such tubes with these caps or closure members when packing the tubes for shipment. It is most important to such manufacturers that the cost of these caps or closure members be kept at the lowest possible minimum.

An object of the invention is to provide a cap or closure member for the outer end of a valve stem and which is so designed that it can be manufactured economically, quickly and simply and thus can be sold at a relatively low price.

It will be appreciated that when large numbers of inner tubes are packed with the valve stems thereof equipped with such caps or closure members, the facility and quickness with which such caps or members can be applied to the valve stems amounts in the aggregate to a substantial consideration from the viewpoint of time. This, of course, is true also wherever it is necessary to apply a large number of the caps or members to valve stems as, for example, in the final assembly of automobiles and the mounting of the tires on the wheels thereof.

It is also desirable that the caps or closure members be so designed that they can be quickly applied to the valve stems by the ultimate users of the inner tubes as, for example, when inflating the tires of a motor vehicle.

Another object of the invention, therefore, is to provide a cap or closure member for the outer end of a valve stem, and which is so designed that it can be applied to the valve stem in a minimum amount of time.

As previously stated, it has been customary to internally thread these caps or closure members so that they can be screwed upon the threaded nipple at the outer end of the valve stem. It is evident that the threading operation increases the cost of the caps and also it will be appreciated that the caps or closure members must be made of material of sufficient thickness to enable the internal threads to be formed therein.

A further object of the present invention is to provide a valve cap or closure member that can be applied to and retained on the threaded nipple at the outer end of the valve stem and which cap or closure member is not internally threaded, thus eliminating the threading operation heretofore essential and also enabling the material from which the cap or closure member is constructed to be of thinner gauge than has been possible to use heretofore.

Further and additional objects and advantages not hereinbefore specified will become apparent hereinafter during the detailed description which is to follow of several embodiments of the invention that are illustrated in the accompanying drawing wherein, Fig. 1 is an elevational view on an enlarged scale of a cap or closure member embodying the invention and which is shown applied to the externally threaded nipple at the outer end of a valve stem that is indicated by dash lines.

Fig. 2 is a top plan view of the cap or closure member shown in Fig. 1.

Fig. 3 is a vertical sectional view through the cap or closure member and is taken on irregular line 3—3 of Fig. 2 looking in the direction of the arrows.

Fig. 4 is a view similar to Fig. 1 but illustrating a different form of cap or closure member from that shown in Fig. 1.

Fig. 5 is a top plan view of the cap or closure member shown in Fig. 4, and

Fig. 6 is a vertical sectional view through the cap or closure member taken on irregular line 6—6 of Fig. 5 and looking in the direction of the arrows.

The caps or closure members embodying the present invention are illustrated in the drawing as applied to the externally threaded nipple 10 of the metal insert that receives the valve insides or core and which insert is secured in a rubber valve stem 11. It will be understood, of course, that the caps or closure members can equally as well be applied to the externally threaded nipples of all-metal valve stems, although this form of valve stem is not illustrated herein.

The cap or closure member shown in Figs. 1 to 3 inclusive is in the form of a thimble 12, preferably made from relatively thin gauge metal, since it is not necessary to internally thread the thimble to enable it to be screwed upon the externally threaded nipple 10 of the valve stem. As will be apparent the cap or closure member in the form of the thimble 12 can be made by very simple manufacturing operations, thus enabling the cost of the cap or closure member to be kept to a minimum. The cap or closure member at its lower or open end is flared outwardly, as indicated at 13, to enable the cap or closure member to interfit tightly with the valve stem adjacent the inner end of the externally threaded nipple 10. In order that the cap or closure member can be effectively retained in position on the externally threaded nipple 10 of the valve stem without the necessity of internally threading the cap or closure member, the thimble 12 is inwardly deformed at a plurality of points spaced circumferentially of the thimble and arranged in a spiral having a lead longitudinally of the thimble and corresponding to the lead of the external threads conventionally formed on the nipples at the outer end of the valve stems. These deformations are indicated in Figs. 1 to 3 inclusive at 14, and it will be seen that they are created by forming substantially horizontally extending indentations (as viewed in the drawing) from the outer side of the thimble to cause corresponding projections on the interior of the thimble. It will be appreciated that although three of the deformations 14 are illustrated in Figs. 1 to 3 inclusive, different numbers of such deformations may be employed as is felt to be desirable. It will be appreciated that the deformations can be formed by the simplest of manufacturing operations, particularly as compared to the internal threading operations heretofore used, and that the deformations 14 of the cap or closure member constitute an effective thread for cooperation with the threads of the nipple 10, wherefore the cap or closure member can be applied to the nipple 10 in the usual way by simply screwing the same thereon until the flared end 13 of the cap or closure member tightly engages with the valve stem adjacent the inner end of the nipple 10 as illustrated in Fig. 3.

In Figs. 4 to 6 inclusive the cap or closure member is in the form of a thimble 15 similar to the thimble 12 except that the thimble 15 is of polygonal cross-sectional configuration, whereas the thimble 12 is illustrated as of cylindrical cross-sectional configuration. It may be preferable to employ a cap or closure member of polygonal cross-sectional configuration, such as shown in Figs. 4 to 6, rather than of cylindrical formation, as shown in Figs. 1 to 3, since the cap or closure member of polygonal cross-sectional configuration can be more conveniently grasped by the fingers in applying it to or removing it from the nipple of the valve stem. The thimble 15 also has its inner or open end flared, as indicated at 16, for the same purpose as the flared end 13 of the thimble 12.

In place of the deformations or indentations 14 referred to in the description of the thimble 12, the thimble 15 is horizontally slit (as viewed in the drawing) at points spaced circumferentially of the thimble and located in a spiral having a lead longitudinally of the thimble and corresponding to the lead of the usual threads on the valve stem member. The horizontal slits are indicated at 17, and it will be noted that there are short vertical slits 18 formed at each end of each horizontal slit 17 as clearly indicated in Fig. 4. The material of the thimble 15 bounded by the slits 17 and 18 is then bent inwardly to form barbs 19 internally of the thimble, it being observed that such barbs will have an inherent spring action.

In the illustration of Figs. 4 to 6 inclusive there are three of these internal barbs 19, but it will be understood that this number can be varied as desired. The thimble 15 can be applied to the valve stem by merely pushing the same downwardly upon the nipple until the flared portion 16 tightly engages the stem, inasmuch as the spring barbs 19 being inclined toward the closed end of the thimble can pass over the threads of the nipple 10 in a manner similar to a pawl idling over a ratchet.

It will be appreciated that a cap or closure member constructed in the manner described with respect to the thimble 15 can be applied to the nipple of a valve stem very quickly, inasmuch as it is simply necessary to push the cap or closure member onto the nipple. Consequently this type of cap or closure member would possess many advantages where a large number of the same must be applied as rapidly as possible.

It will be understood that the barbs 19 although permitting the thimble 15 to be pushed into position on the nipple 10 effectively serve as threads to prevent the displacement of the thimble from the nipple and that in removing the thimble 15 from the nipple it is necessary to unscrew the same therefrom. As a matter of fact the inherent resilience of the barbs 19 will act most effectively to hold the thimble in position on the nipple against any tendency of the thimble to unscrew off of the nipple because of vibration or other reasons.

From the foregoing description of two embodiments of the invention it will be seen that a cap or closure member constructed in accordance with the invention can be most economically manufactured, inasmuch as it is not necessary to internally thread the same, and for the further reason that thinner gauge material can be employed in its construction. Likewise the cap or closure member can be produced by the simplest of manufacturing processes or operations. Furthermore, as has already been stated, it will have been noted that the cap or closure member of the form shown in Figs. 4 to 6 inclusive can be applied to the nipple of a valve stem in a most expeditious manner, since it can simply be pushed into position thereon.

Although several embodiments of the invention have been illustrated and described herein it will be appreciated that the invention is susceptible of various modifications and adaptations within the scope of the appended claims.

Having thus described my invention I claim:

1. A cap or closure member for the externally threaded reduced outer end or nipple of a valve stem having an enlarged portion inwardly of said end or nipple providing a shoulder between said end or nipple and said enlarged portion, said cap or closure member comprising a thimble formed from relatively thin gauge metal and adapted to interfit with said outer end of the valve stem and provided with a plurality of inwardly extending deformations spaced circumferentially of the thimble and arranged in a spiral having a lead longitudinally of the thimble and corresponding substantially to the lead of the thread on the reduced outer end or nipple of the valve stem, said thimble having its open or inner end flared and shaped complementary to said shoulder of the valve stem and bearing against the same and providing a continuation of the outer surface of the enlarged portion of the valve stem.

2. A cap or closure member for the externally threaded reduced outer end or nipple of a valve stem having an enlarged portion inwardly of said end or nipple providing a shoulder between said end or nipple and said portion, said cap or closure member comprising a thimble formed of relatively thin gauge metal and adapted to fit said outer end or nipple of the valve stem and provided at a plurality of points spaced circumferentially of the thimble and arranged in a spiral having a lead longitudinally thereof and substantially corresponding to the lead of the thread on the outer end or nipple of the valve stem with transverse slits and longitudinal slits at each end of said transverse slits, the material of the thimble between said slits being bent inwardly to form interiorly of the thimble barbs extending angularly toward the closed end of the thimble, said thimble having its open or inner end flared and shaped complementary to said shoulder on the valve stem and bearing against the same and forming a continuation of the outer surface of the enlarged portion of the valve stem.

3. A cap or closure member for the externally threaded outer end of a valve stem and comprising a thimble adapted to telescope upon said outer end and formed of relatively thin material, said thimble being formed of a plurality of flat sides, said thimble being provided at certain of its flat sides with inwardly extending deformations located at points spaced peripherally of the thimble and having a lead longitudinally of the thimble, said deformations being of such length as to be substantially tangent to the root circle of the threaded outer end of the valve stem.

JOHN C. CROWLEY.